United States Patent
Jelaca et al.

(10) Patent No.: US 9,024,537 B2
(45) Date of Patent: May 5, 2015

(54) DIMMING METHOD AND SYSTEM FOR LED LAMP ASSEMBLIES

(71) Applicant: Dialog Semiconductor GmbH, Kirchheim/Teck-Nabern (DE)

(72) Inventors: Nebojsa Jelaca, Graz (AT); Stefan Zudrell-Koch, Kirchheim am Neckar (DE)

(73) Assignee: Dialog Semiconductor GmbH, Kirchheim/Teck-Nabern (DE)

( * ) Notice: Subject to any disclaimer, the term of this patent is extended or adjusted under 35 U.S.C. 154(b) by 46 days.

(21) Appl. No.: 13/748,006

(22) Filed: Jan. 23, 2013

(65) Prior Publication Data

US 2013/0187568 A1    Jul. 25, 2013

(30) Foreign Application Priority Data

Jan. 25, 2012    (EP) .................................... 12152546

(51) Int. Cl.
| | | |
|---|---|---|
| G05F 1/00 | (2006.01) |
| H05B 37/02 | (2006.01) |
| H05B 39/04 | (2006.01) |
| H05B 41/36 | (2006.01) |
| H05B 33/08 | (2006.01) |

(52) U.S. Cl.
CPC ............ H05B 37/02 (2013.01); H05B 37/0263 (2013.01)

(58) Field of Classification Search
CPC .......... H05B 33/0815; H05B 33/0827; H05B 33/029; H05B 41/3927; H05B 41/28; B23K 9/0671; B23K 9/0732
USPC ..................... 315/297, 294, 301, 307; 336/30
See application file for complete search history.

(56) References Cited

U.S. PATENT DOCUMENTS

| | | | |
|---|---|---|---|
| 2005/0253533 A1* | 11/2005 | Lys et al. ........................ | 315/224 |
| 2006/0226795 A1* | 10/2006 | Walter et al. .................... | 315/312 |
| 2006/0238136 A1* | 10/2006 | Johnson, III et al. ........... | 315/185 R |
| 2008/0054815 A1* | 3/2008 | Kotikalapoodi et al. ........ | 315/192 |
| 2010/0277072 A1* | 11/2010 | Draper et al. ................... | 315/149 |
| 2010/0308739 A1* | 12/2010 | Shteynberg et al. ............. | 315/193 |
| 2011/0115399 A1* | 5/2011 | Sadwick et al. ................ | 315/287 |
| 2013/0293131 A1* | 11/2013 | Sadwick ......................... | 315/200 R |

FOREIGN PATENT DOCUMENTS

DE    4431984    6/1995

OTHER PUBLICATIONS

European Search Report 12152546.3-2206 Mail date—Jul. 30, 2012, Dialog Semiconductor GmbH.

* cited by examiner

*Primary Examiner* — Dylan White
(74) *Attorney, Agent, or Firm* — Saile Ackerman LLC; Stephen B. Ackerman

(57) ABSTRACT

The present document relates to a method and system for dimming low power illumination devices, such as LED (Light Emitting Diode) assemblies. A controller for a driver circuit of a light source is described. The driver circuit controls a plurality of illumination states of the light source using a power converter, which converts power from an input voltage waveform of a mains power supply into a drive signal for the light source. The controller comprises an event detection unit; a state register to store an indication of a current state of the illumination states; a state processor to determine a target state of the illumination states, based on the detected event and based on the current state; and an output control unit controls the power converter of the driver circuit to provide a drive signal for the target state.

30 Claims, 10 Drawing Sheets

DIMMING METHOD AND SYSTEM FOR LED LAMP ASSEMBLIES

BACKGROUND

1. Technical Field

The present document relates to illumination systems. In particular, the present document relates to a method and system for controlling the illumination state of solid state lighting devices such as LED or OLED assemblies.

2. Background

For many decades GLS (General Lighting Service) or incandescent lamps have been the first choice for illumination in residential applications. These light sources could easily be dimmed using so called phase-cut dimmers. This has led to a large installed base of such wall dimmers. These dimmers are designed to work on relatively large loads with a substantial effective power over apparent power.

New types of light sources like CFL (Compact Fluorescent Lamp) or LED lamps offer very small loads (typical a factor of 10 less than the equivalent GLS lamp) in combination with a highly nonlinear behavior and a large capacitive impedance due to the presence of EMI (Electro-Magnetic Interference) filter networks. Due to these aspects, LED based lamp and CFL assemblies cannot be dimmed inherently using existing phase-cut dimmers. With advanced electronics it is possible to emulate dimming functionality. However, due to technical/physical limitations the dimming range as well as the range of supported dimmers and configurations in terms of the number and mix of parallel lamps operated with a particular dimmer is limited.

The present document is directed at overcoming these limitations and at fully exploiting the very excellent dimmability and controllability of LED based lamps. The method and apparatus described in the present document enable dimming of LEDs in all kinds of applications and with all kinds of dimmers of the installed base. Furthermore, the described method and apparatus allow for dimming between 100% and (almost) 0%.

With the changeover from GLS lamps and discharge lamps, mainly fluorescent lamps, to solid state lamps the controllability of such lamps extends from setting a defined light output intensity to changing the intensity at each wavelength which is emitted by the light source. This includes setting a particular colour in the emitted light or changing the so called colour correlated temperature CCT which is a measure if the light is perceived as "warm" or "cold". In general in this document the term "dimming" is used for setting the total light or lumen intensity as well as for setting the power of individual spectral segments, while keeping the overall light output constant and in this way changing the radiated spectrum.

The particular configuration of the radiated light at a given point in time may be referred to as the illumination state.

SUMMARY

According to an aspect a controller for a driver circuit of a light source is described. The controller is preferably applied to provide a dimming function for the light source. Typical examples for the light source are solid state lighting (SSL) devices such as an array of one or more light emitting diodes (LEDs) or of one or more organic LEDs (OLEDs). The driver circuit is configured to control the light source according to a plurality of illumination states using a power converter, wherein the power converter is configured to convert power derived from an input voltage waveform of a mains power supply into a drive signal for the light source.

The controller may be implemented using a digital programmable control integrated circuit. In particular, the controller may be implemented using a chip solution without the use of a microcontroller. As such, the control unit for the power converter and the intelligence for detecting events may be implemented on a single chip. In particular, the logic for event detection and/or for the control of the power converter may be implemented has hardware (and not software), thereby reducing the required resources, memory and the required clock frequency. In other words, the controller may be implemented as an integrated circuit using wired logic.

The controller may comprise an event detection unit configured to determine a particular event (referred to as a detected event) of a plurality of events encoded within the input voltage waveform of the mains power supply. Furthermore, the controller may comprise a state register, e.g. a memory device, configured to store an indication of a current state (and/or a target state) of the plurality of illumination states. In addition, the controller may comprise a state processor configured to determine a target state of the plurality of illumination states, based on the detected event and based on the current state. An output control unit within the controller may be configured to control the power converter of the driver circuit to provide a drive signal for the target state.

As such, the controller may be configured to decouple the control of one or more illumination states (e.g. a dim state or a fixed illumination state at a particular intensity level) of the light source from the actual input voltage waveform and the amount of power supplied by the mains supply. As such, the control of the illumination states is performed by the controller, regardless of the actual power supplied by the mains power supply (as long as sufficient power for the low energy light source is provided). On the other hand, the input voltage waveform (or a signal derived from the input voltage waveform) is analyzed to detect one or more of a discrete number of events which are encoded into the input voltage waveform. The discrete number of encoded events is typically in the range of 3, 4, 5, 6, 7, 8, 9, or 10. In particular, the discrete number of events (and their parameters) may be selected to ensure a sufficiently high reliability for detecting any one of the encoded events by the event detection unit of the controller.

As a result of decoupling the control of the illumination states of the light source from the power supplied by the mains supply, the controller may be configured to control the power converter to provide a drive signal for a smooth and stable dimming of the light source. Such dimming may be initiated by the controller subject to determining a detected event associated with a dimming command. Furthermore, such dimming may be performed even though the input voltage waveform of the mains power supply remains substantially unchanged (subsequent to the detection of the event associated with a dimming command).

The state processor may be configured to determine the target state in accordance with a pre-determined state machine. The state machine may be encoded into the state processor (e.g. as software, firmware or hardware). Typically, the state machine defines a plurality of illumination states, as well as events which trigger transitions between the illumination states. The controller may be configured to program or adjust the plurality of illumination states, the plurality of events and/or the state machine defining the transitions between the plurality of illumination states. More specifically, the controller may be configured to adjust one or more parameters of the plurality of events (e.g. the physical conditions which need to be met for detecting an event). As indicated above, an event is encoded within the input voltage waveform. The parameters, which define the conditions (e.g. a root mean square voltage value of the input voltage waveform) which define an event, may be adjustable. In a similar manner, the controller may be configured to adjust one or more parameters of the plurality of illumination states (e.g. the behavior of the light source within each of the plurality of illumination states). In particular, the controller may be configured to define and adjust settings of the driver circuit (e.g. the duty cycle of a power switch), which control the respective behavior of the light source for the corresponding illumination states. The settings of the driver circuit (e.g. the length of the duty cycle of a power switch) may be stored in the state register. In addition, the controller may be configured to adjust the logic comprised within the state processor, wherein the logic defines how the target state is determined based on the detected event and based on the current state. In other words, the controller may be configured to adjust the logic of the state machine.

The plurality of events may comprise a predetermined modulation of the input voltage waveform. In other words, the plurality of events may be defined via a respective predetermined modulation of the input voltage waveform. Examples for such a predetermined modulation may be a modulation of a phase section of the input voltage waveform and/or a modulation of the amplitude of the input voltage waveform or the frequency. Another modulation technique can be a time dependant change between AC and DC or rectified AC using a particular coding scheme.

An event of the plurality of events may be an instant event, i.e. an event which may be detected at a particular time instant. Alternatively or in addition, an event may be defined by a sequence of instant events (i.e. a sequence of sub-event), therefore allowing the detection of the complex event only subsequent to detection of a sequence of corresponding time instants. An example for an instant event is a first instant event for which a characteristic value derived from the input voltage waveform at the particular time instant is greater than a pre-determined upper threshold. The characteristic value may e.g. be a root mean square (RMS) voltage value derived from the input voltage waveform within a time interval around the particular time instant. Further examples for instant events are a second instant event for which a characteristic value derived from the input voltage waveform at the particular time instant is smaller than a pre-determined lower threshold, and a third instant event for which a characteristic value derived from the input voltage waveform at the particular time instant lies within a pre-determine interval.

As indicated above, the plurality of events may comprise one or more sequential events. A sequential event may comprise a sequence of instant events in a pre-determined chronology. An example for a sequential event may be the succession of the first, the second and the first instant event within a pre-determined time interval. The definition of sequential events allows increasing the number of discrete events which may be detected by the controller. Furthermore, sequential events may be used to control complex illumination patterns (e.g. the dimming of the light source) via a mains on/off switch.

An illumination state of the light source may describe the behavior of the light source (e.g. the intensity level of the light source as a function of time). Examples for illumination states are a dim state during which an intensity level of the light source increases and/or decreases at a pre-determined dim rate; an on state during which the intensity level of the light source is substantially constant at a pre-determined maximum intensity level; an off state during which the intensity level of the light source is substantially zero; and a hold state during which the intensity level of the light source is maintained substantially constant at the intensity level of the light source at the time of entering the hold state. Alternatively or in addition, one or more fixed states may be defined. A fixed state may be defined as a state during which the intensity level of the light source is maintained substantially constant at a respective fixed intensity level.

The controller may comprise a timebase unit configured to generate a clock signal based on (or from) a cycle of the mains power supply. In other words, the timebase unit may analyze the input voltage waveform (or a signal derived from the input voltage waveform) to determine a clock signal. The clock signal may be used for event detection or to control operation of the controller, e.g. to be in synch with the mains power supply. As such, the event detection unit may be configured to determine a detected event under consideration of the clock signal (e.g. in case of a sequential event). Furthermore, one or more of the plurality of illumination states may take into account the clock signal (e.g. the dim state in order to define the dim rate). In addition, the clock signal may be taken into account to manage the transition from the current state to the target state (e.g. in order to implement a smooth transition between the current state and the target state).

According to another aspect, the controller may analyze the input waveform to directly determine the illumination state from the input waveform. The controller may determine the light control information (i.e. an event) such as the dimming level from the input waveform by analyzing the input waveform. This may be done e.g. by measuring the phase-cut angle in discrete steps such as in 10% steps of the maximum illumination (or any other appropriate partitioning), or in steps of p/N of the phase-cut angle with N being an integer such as 5 or 10. Other ways of determining discrete light control information from the input waveform are possible as well, such as analyzing the power in the input waveform, or considering the current flow. This discrete light control information (i.e. the plurality of events) can then be associated with a respective illumination state e.g. an illumination state for 10% illumination, further states for 20%, 30%, etc illumination. This means that the detection of a particular event directly leads to a target illumination state (regardless the current illumination state). A preferred example comprises three discrete illumination states for low, medium, and high illumination (e.g. 30%, 65%, 100%). In this example, the controller needs only to discriminate three discrete light control information (i.e. events) in the input waveform, e.g. three ranges for the phase-cut angle (<30%, 30%-65%, >65%). Other partitions of the light control information (i.e. other definitions of the events) in the input waveform for discretization are possible as well and within the reach of the skilled person. In this aspect, only a relatively small number of discrete light control information (i.e. a relatively small number of events) corresponding to easily detectable ranges in the input voltage must be detected by the controller, which facilitates the controller design compared to an analogue mode where the information in the input voltage is used directly proportional to determine the illumination level. In the suggested discrete approach, corresponding (discrete) illumination states may be assigned to the detected discrete light control information. Each illumination state may have corresponding control parameters (i.e. settings) for the power converter or the driver circuit, such as power or current control parameters associated with the state. For example, each state may have associated control parameters (i.e. settings) to drive the power converter so as to achieve a desired illumination level. This aspect may be combined in many ways with the other aspects set out in this document.

The relationship between the detected discrete light control information (i.e. the detected events) corresponding to the illumination states and the control parameters associated with the states may be non-linear. In other words, the partitioning of the analyzed information in the input waveform (such as the ranges of phase-cut angles) must not correspond to the distribution of control parameters or illumination levels to the states. For example, the partitioning of the information in the input waveform for obtaining discrete light control information and the corresponding mapping to states may be non-linear to accommodate non-linear effects of phase-cut dimmers, while the control parameters or illumination levels associated with the states may be linearly distributed. For example, a five level phase-cut angle partitioning may be: <30%, 30%-45%, 45%-55%, 55%-70%, >70%. Such phase-cut angle partitioning may accommodate non-linearities in the accuracy of a dimmer over the dimming range and help to overcome problems with reliable detection of phase-cut angles for the boundary areas of the dimming range (i.e. near very low and near full light intensity). The control parameters for the illumination levels corresponding to the five illumination states may however be distributed in a linear way, e.g. 20%, 40%, 60%, 80%, 100% of a maximum intensity level. Thus, the relationship between dimming information in the input waveform and the corresponding control parameters or illumination levels is non-proportional. Of course, other arrangements may be contemplated by the skilled person such as a non-linear distribution of illumination levels to accommodate for non-linear effects in the generation of light or in human perception in combination with a linear distribution of phase-cut angle ranges.

The output control unit may control the power converter using e.g. a pulse width modulated signal to control the duration of the on- and off-states of a power switch, (e.g. a MOSFET) of the power converter. Alternatively or in addition, the output control unit may itself comprise a power switch configured to switch between an on-state and an off-state of the power switch (it should be noted that the on-state and the off-state of the power switch are to be distinguished from the on states and off states of the light source).

It should be noted that the light source may comprise a plurality of sub light sources. By way of example, the light source may comprise Red, Green and Blue (RGB) LEDs to generate white light. In the latter case, the sub light sources may be the individual red, green and blue LEDs comprises within the light source. It may be desirable to independently control the illumination of the sub light sources. In case of RGB LEDs, it may e.g. be desirable to independently control the illumination of the red, green, and blue LEDs, in order to control the color/temperature of the resulting (white) light. As such, each of the plurality of illumination states of the light source may comprise a sub state for each of the plurality of sub light sources. By way of example, the plurality of illumination states may define different colors of the light source, wherein the different colors of the light source are obtained via different sub states for the corresponding sub light sources.

The driver circuit may be configured to control the plurality of sub light sources using a respective plurality of drive signals, and the output control unit may be configured to control the power converter of the driver circuit (or a respective plurality of power converters) to provide the plurality of drive signals for the plurality of sub light sources. Overall, the controller may be configured to control the transition between the different illumination states (defining respective sub states for the sub light sources), subject to a pre-determined state machine and subject to the detection of events. Hence, the controller may be used to control e.g. the color/temperature of the light source (comprising a plurality of sub light sources).

In general SSL light source devices can be dimmed in different ways. Common techniques are changing the level of the DC current supplied to the device or changing the average current using PWM (pulse width modulation) control. Any combination of both techniques is also possible. This document refers to all different dimming techniques.

According to another aspect, a driver circuit for a light source is described. The driver circuit is configured to control a plurality of illumination states of the light source. For this purpose, the driver circuit comprises a power converter configured to convert power derived from an input voltage waveform of a mains power supply into a drive signal for the light source. The drive signal for the light source may comprise a pre-determined (fixed) minimum drive voltage (e.g. the on-voltage of an array of LEDs). In other words, the power converter may be configured to provide a drive voltage which is sufficient to supply the on-voltage of the array of LEDs. Furthermore, the drive signal may comprise a drive current. The driver circuit may be configured to adjust the drive current, in order to adjust the intensity of the light emitted by the light source. In particular, the drive current may be adjusted in accordance with a current illumination state of the light source. Hence, the drive signal depends on the current state of the plurality of illumination states, thereby ensuring that the light source is operating in the current state (wherein the current state defines e.g. a particular fixed intensity level).

Furthermore, the driver circuit comprises a controller according to any of the aspects outlined in the present document. The controller may be configured to determine a target state of the plurality of illumination states from the input voltage waveform (notably from an event detected from the input voltage waveform) and from the current state. In addition, the controller may be configured to control the power converter to provide a corresponding drive signal for the target state.

According to a further aspect, a light bulb assembly is described. The light bulb assembly comprises an electrical connection module (e.g. a standardized socket) configured to electrically connect to a mains power supply, thereby providing an input voltage waveform. In addition, the light bulb assembly comprises a driver circuit according to any of the aspects outlined in the present document. The driver circuit may be configured to control a target state of a plurality of illumination states of a light source, based on a detected event from a plurality of events which may be encoded within the input voltage waveform. Furthermore, the light bulb assembly comprises the light source configured to provide light in accordance with the target state.

According to another aspect, a method for controlling a plurality of illumination states of a light source is described. The method may comprise converting power derived from an input voltage waveform of a mains power supply into a drive signal for the light source, wherein the drive signal depends on a current state of the plurality of illumination states. Furthermore, the method may comprise determining a detected event of a plurality of events encoded within the input voltage waveform, as well as determining a target state of the plurality of illumination states, based on the detected event and based on the current state. The method proceeds in controlling a power converter to provide the drive signal for the target state.

According to a further aspect, a software program is described. The software program may be adapted for execution on a processor and for performing the method steps outlined in the present document when carried out on a computing device (e.g. on the controller described in the present document).

According to another aspect, a storage medium is described. The storage medium may comprise a software program adapted for execution on a processor and for performing the method steps outlined in the present document when carried out on a computing device (e.g. on the controller described in the present document).

It should be noted that the methods and systems including its preferred embodiments as outlined in the present document may be used stand-alone or in combination with the other methods and systems disclosed in this document. Furthermore, all aspects of the methods and systems outlined in the present document may be arbitrarily combined. In particular, the features of the claims may be combined with one another in an arbitrary manner.

BRIEF DESCRIPTION OF THE DRAWINGS

The invention is explained below in an exemplary manner with reference to the accompanying drawings, wherein.

DETAILED DESCRIPTION

In the present document, a light bulb "assembly" includes all of the components required to replace a traditional incandescent filament-based light bulb, notably light bulbs for connection to the standard electricity supply. In British English (and in the present document), this electricity supply is referred to as "mains" electricity, whilst in US English, this supply is typically referred to as power line. Other terms include AC power, line power, domestic power and grid power. It is to be understood that these terms are readily interchangeable, and carry the same meaning.

Typically, in Europe electricity is supplied at 230-240 VAC, at 50 Hz and in North America at 110-120 VAC at 60 Hz. The principles set out in the present document apply to any suitable electricity supply, including the mains/power line mentioned, and a DC power supply, and a rectified AC power supply.

Figure 1:
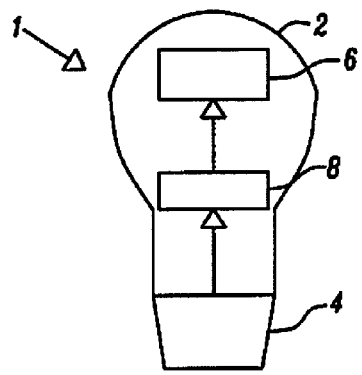
FIG. 1 illustrates a block diagram of an example light bulb.

FIG. 1 is a schematic view of a light bulb assembly. The assembly 1 comprises a bulb housing 2 and an electrical connection module 4. The electrical connection module 4 can be of a screw type or of a bayonet type, or of any other suitable connection to a light bulb socket. Typical examples for an electrical connection module 4 are the E11, E14 and E27 screw types of Europe and the E12, E17 and E26 screw types of North America. Furthermore, a light source 6 (also referred to as an illuminant) is provided within the housing 2. Examples for such light sources 6 are a CFL tubes or a solid state light source 6, such as a light emitting diode (LED) or an organic light emitting diode (OLED) (the latter technology is referred to as solid state lighting, SSL). The light source 6 may be provided by a single light emitting device, or by a plurality of LEDs.

Driver circuit 8 (also referred to as power supply arrangement in the present document) is located within the bulb housing 2, and serves to convert supply electricity received through the electrical connection module 4 into a controlled drive current for the light source 6. In the case of a solid state light source 6, the driver circuit 8 is configured to provide a controlled direct drive current to the light source 6.

The housing 2 provides a suitably robust enclosure for the light source and drive components, and includes optical elements that may be required for providing the desired output light from the assembly. The housing 2 may also provide a heat-sink capability, since management of the temperature of the light source may be important in maximising light output and light source life. Accordingly, the housing is typically designed to enable heat generated by the light source to be conducted away from the light source, and out of the assembly as a whole.

In order to make an LED or a CFL lamp compatible with phase-cut dimmers, the power supply arrangement 8 for such a LED or CFL lamp 1 should typically provide at least the following three different functions:
1. Take energy from the mains voltage set by the dimmer.
2. Filter any voltage fluctuation at the mains supply in order to keep the light output free of flicker.
3. Adjust the LED/CFL lamp current/power (and by consequence the intensity of the emitted light) to the requested dim level.

The present document describes methods and systems which allow for the implementation of the above mentioned three functions. In the following, such methods and systems will be described in the context of LED lamps. It should be noted, however, that the methods and systems described herein are equally applicable to controlling the power provided to other types of illumination technologies such as other types of SSL based lamps (e.g. OLEDs) and CFL lamps.

Figure 2A:
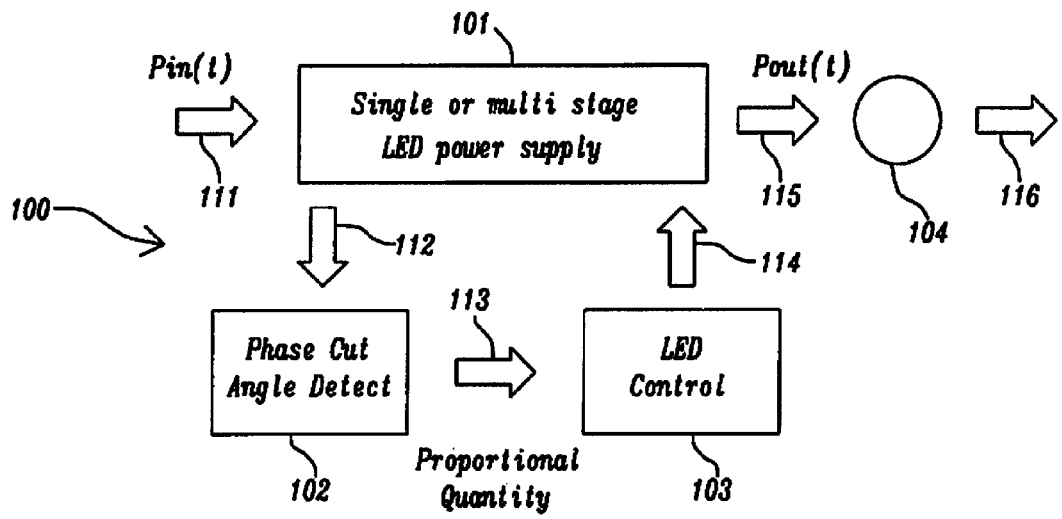
FIGS. 2a and 2b illustrate example power supply arrangements for an LED lamp.
Figure 2B:
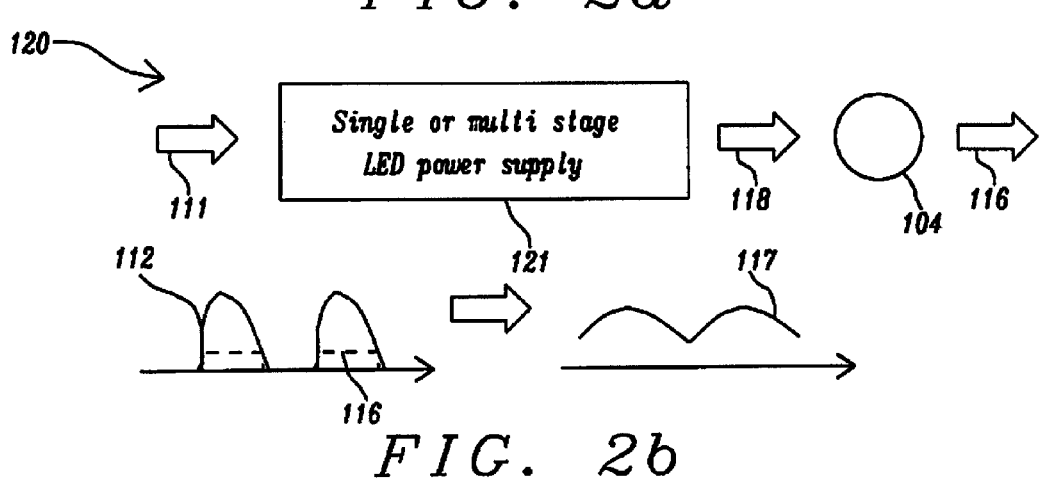
Figure 2C:
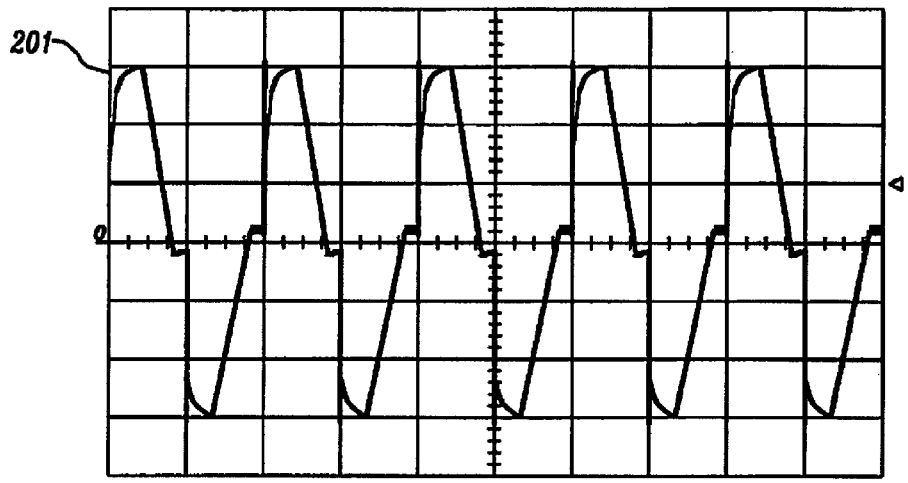
FIGS. 2c, 2d, 2e and 2f illustrate example input voltage waveforms.
Figure 2D:
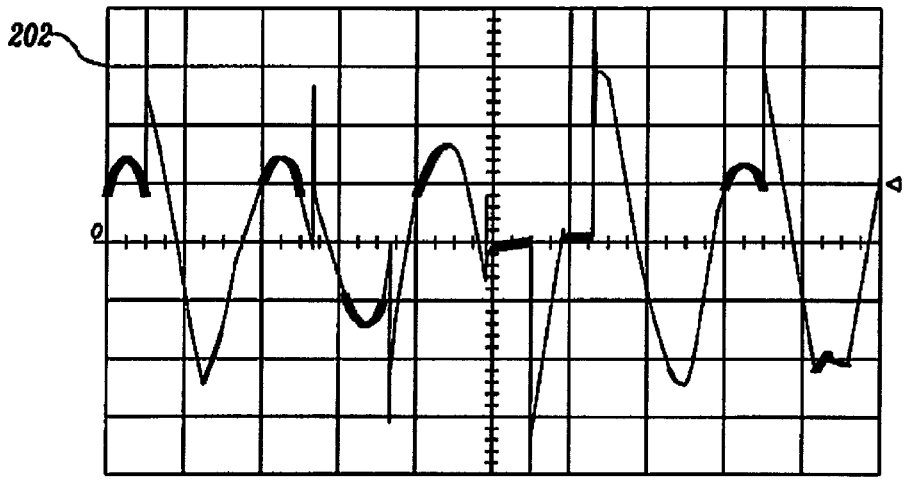
Figure 2E:
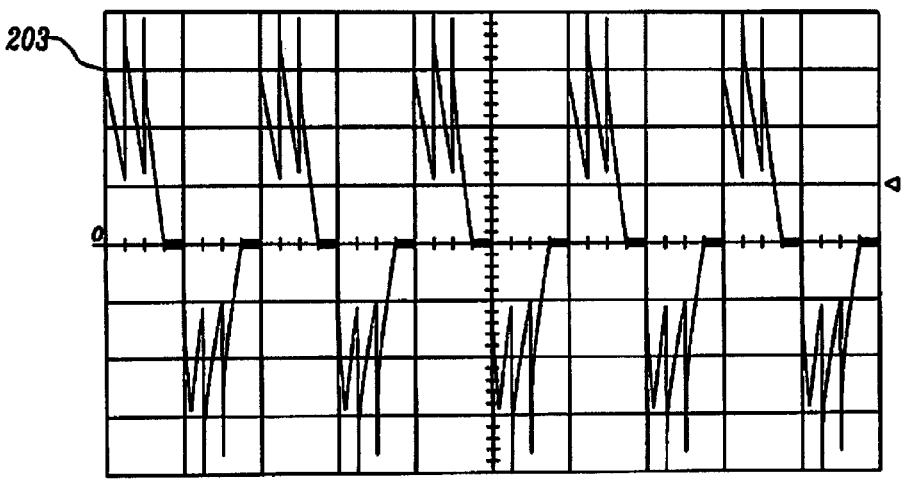
Figure 2F:
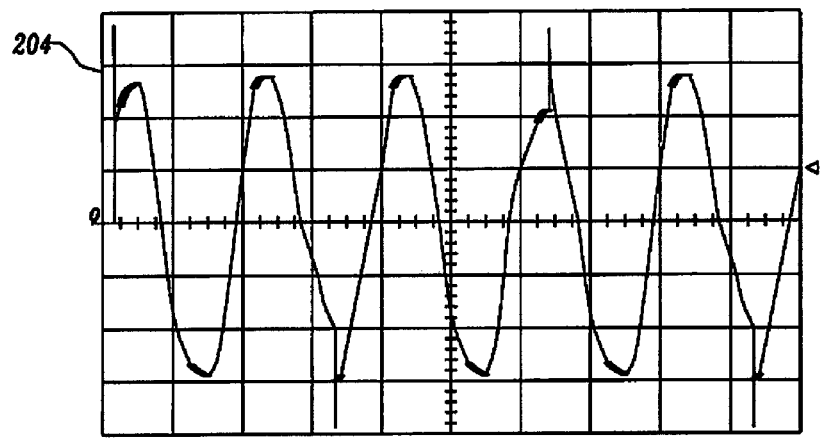

FIGS. 2a and 2b illustrate block diagrams of power supply arrangements 100, 120 which may be used to control the power for illuminating the LED 104 based on the power provided by the mains power supply. The power supply arrangements 100, 120 receive an input power 111 from the mains supply. The input power 111 may have been adjusted using a dimmer. Various types of dimmers exist, but the most frequently used type of dimmer is a so-called thyristor dimmer or phase-cut dimmer. Thyristor dimmers switch on at an adjustable time (phase angle) after the start of each alternating current half-cycle, thereby altering the voltage waveform applied to lamps and so changing its root mean squared (RMS) effective voltage value. Because thyristor dimmers switch part of the voltage supplied (instead of absorbing it), there is very little wasted power at the dimmer Dimming can be performed almost instantaneous and is easily controlled by remote electronics. Typically, TRIACs (Triode for Alternating Current) are used as thyristors within the dimmers in domestic lightening application. Variants of dimmers are leading edge phase-cut dimmers, trailing edge phase-cut dimmers or intelligent dimmers configured to switch between leading edge and/or trailing edge phase-cut.

As such, phase-cut dimmers are typically configured to remove a particular phase of the sinusoidal mains voltage. This leads to a reduction of the RMS voltage. supplied to conventional incandescent lamp, thereby reducing the intensity of the light emitted by the incandescent lamp. On the other hand, energy efficient illumination technologies such as LED or OLED require a pre-determined level of direct current (DC) voltage, such that the modifications to the sinusoidal mains voltage performed by the dimmer cannot be directly used for modifying the intensity of the emitted light. Consequently, power supply arrangements for such energy efficient lamps typically comprise means for converting the phase-cut input voltage into an appropriately reduced power for the illuminant (e.g. the LED or OLED).

Returning now to the example power supply arrangements 100, 120 of FIGS. 2a and 2b. The example power supply arrangement 100 comprises a phase-cut angle detection unit 102 which senses the input voltage 112 and which estimates the angle at which the original sinusoidal mains voltage has been cut by the dimmer. The estimated angle 113 indicates a desired dim level and is passed to an LED control unit 103 which controls the LED power supply 101 via a control signal 114 to provide an output power 115 to the LED 104 (referred to as light source 6 in FIG. 1) which drives the LED 104 to provide light 116 at the desired dim level.

An alternative power supply arrangement 120 is configured to determine the output power 118 directly from the "intended" input power 111 via the input current 116. The input current 116 is an indication of the "intended" input power 111. The LED power supply 121 is configured to derive the output current 117 (and consequently the output power 118) for the LED 104 directly from the input voltage waveform 112.

Typical phase-cut dimmers only perform correctly when having a resistive load connected to them, which consumes a pre-determined minimum amount of power (as e.g. a conventional incandescent lamp of at least 40 W). When being used for dimming energy efficient LED lamps (at power levels in the range of 2 to 10 W), the input voltage waveform 112 generated by typical phase-cut dimmers may be significantly distorted. Distortions to the input voltage waveform may be due to effects such as multi firing, capacitive phase shift, and discontinuous operation of the dimmers. Example waveforms 201, 202, 203, 204 of input voltages are illustrated in FIGS. 2c, 2d, 2e and 2f. It can be seen that it is rather difficult (if not impossible) to reliably detect a phase-cut angle from the input voltage waveforms shown in FIGS. 2c, 2d, 2e and 2f. Consequently, typical problems of power supply arrangements 100, 120 which derive the output power 115, 118 to the illuminant 104 directly from the input voltage waveform 112 received from the mains power supply are one or more of the following:

Due to the fact that the dimming level is directly derived from the given phase-cut angle, instabilities related to the detection of the phase-cut angle (e.g. multi firing, capacitive phase shift, discontinuous operation of dimmers) are directly propagated to the light source (also referred to as illuminant) 104 causing various modes of instabilities.

Because the observed phase-cut angle is a function not only of the dimmer and the attached lamp, but also of the overall system setup (e.g. of the number of lamps which are attached in parallel to the dimmer), it is not reliable to predict the system behavior under all system setup conditions. In other words, the system (comprising various combinations of lamps) attached to the dimmer may vary, thereby varying the behavior of the dimmer and consequently affect the shape of the input voltage waveform. This is detrimental to a reliable determination of the phase-cut angle and the desired dim level.

In view of the above mentioned shortcomings of power supply arrangements which derive the information about the amount of power supplied to the LED 104 directly from the amount of power supplied by the mains supply, the present document presents a power supply arrangement which (completely) decouples the dimming function from the energy flow to the LED 104. In particular, it is proposed to handle separately the problem of maintaining the required energy input and the problem of setting and controlling the appropriate LED current. In the power supply arrangement described in the present document, the dimming level of the LED 104 is no longer an instantaneous value proportional to a measured physical quantity (e.g. proportional to the input voltage waveform). In the proposed system, the dim level becomes an internal digital state of the lamp, wherein the state of the lamp (i.e. the dim level of the lamp) is incremented or decremented in response to events generated at the mains supply. These events are non-proportional with regards to the input voltage waveform. In other words, a modification of the phase-cut angle of the input voltage waveform by a dimmer will not be translated into a proportional event leading to a proportional dimming or the light. Example events are the turning on/off of a mains switch or the setting of the dimmer phase angle to a pre-determined value. As a result of detecting such events at the lamp, the dim level of the LED 104 may be increased or decreased.

In other words, it is proposed to control the power supply to the LED 104 subject to pre-determined illumination states and in accordance with corresponding settings of the power supply arrangement. The settings for the pre-determined illumination states are stored within the power supply arrangement (which is typically integrated into an LED lamp together with the LED 104). The pre-determined illumination states are decoupled from the input voltage waveform provided by the mains supply and define a discrete number of stable lamp states (without flickering). Examples for such lamp states are:

State A: Light is steadily on (at a fixed intensity level between a minimum intensity up to a maximum intensity).

State B: Light is off (zero intensity).

State C: The intensity of the light is increased from a current intensity (e.g. State A or B) at a pre-determined increase rate.

State D: The intensity of the light is decreased from the current intensity (e.g. State A or B) at a pre-determined decrease rate.

It should be noted that other pre-determined lamp states may be defined (e.g. a state providing light at an undulating intensity at a pre-determined rate, or a state providing a saw like increase and/or decrease of the intensity at a pre-determined rate between the minimum intensity and the maximum intensity, etc.). The power supply arrangement is typically configured to provide the power to the LED 104 for some or all of the above mentioned lamp states. In particular, the power supply arrangement may be configured to adjust the current towards the LED 104 such that the LED 104 performs the illumination activity defined by the state.

Furthermore, the power supply arrangement is configured to detect one or more events received from the mains power supply via the input voltage waveform. The number of events may be limited in order to ensure a reliable detection of such events. Example events may be:

Event A: Light UP (e.g. detecting an input voltage having a root means square (RMS) value higher than a pre-determined on threshold).

Event B: Light DOWN (e.g. detecting an input voltage having an RMS value lower than a pre-determined off threshold).

Event C: Light HOLD (e.g. detecting an input voltage having an RMS value within a pre-determined hold interval).

In general terms, it may be stated that the one or more events may be encoded into the input voltage waveform by appropriately modulating (e.g. amplitude modulating and/or phase modulating) the input voltage waveform supplied by the mains power supply. Examples for modulations of the input voltage waveform are the suppression of a portion of the phase (phase-cut), a modification of the supplied peak voltage or power, and/or a modification of the amplitude of the input voltage waveform. Another event could be the detection of a switch over from an AC power supply to a DC power supply, as may occur in situations, where the lamp assembly 1 is disconnected from the mains supply and switched over to an emergency supply. The detection of such an event may e.g. cause the lamp assembly 1 to reduce the illumination level. Furthermore, it should be noted that the events which are transmitted and detected via the input voltage waveform may be combined with further internal and/or external events.

The number of events and the thresholds/intervals may be selected such that a reliable event detection is ensured at the power supply arrangement. The above mentioned example events make use of an appropriate encoding of the (average) input voltage received from the mains supply. In particular, the RMS value of the input voltage waveform within a pre-determined time interval may be taken as a carrier for transmitting control information from the mains supply to the lamp. The number of events (or the number of bits) which may be communicated to the lamp depends on the different voltage levels which can be reliably detected by the power supply arrangement at a particular time instant.

Alternatively or in addition to performing an event detection based on the input voltage received from the mains supply, the event detection may take into account a time parameter. By way of example, the evolution of the input voltage along the time line may be used to encode control information to the power supply arrangement, thereby defining events (or codewords) which are a function of the input voltage and the time. By way of example, the input voltage (e.g. the RMS voltage values) received from the mains supply at a sequence of time instants may be analyzed in order to define an overall event (codeword) which is a function of the sequence of RMS voltage values. As such, an additional time component may be used to increase the number of events (or the number of bits) which may be communicated from the mains supply to the lamp.

The power supply arrangement may be configured to detect one or more of the above mentioned events. Based on the detected event and based on the current state of the lamp, a new state of the lamp may be set and the LED power supply may be controlled to generate the appropriate current for the LED 104 (in accordance with the new state of the lamp). As such, the control of the power supply of the LED 104 is decoupled from the actual settings at the mains supply (e.g. the dimmer settings). The actual settings at the mains supply are used to encode events (i.e. codewords corresponding to instructions) which are interpreted by the power supply arrangement to set the power supply of the LED 104 in accordance with the detected event. This decoupling enables a stable operation of the LED 104, regardless the configuration of lamps which are attached to a dimmer and regardless the distortions incurred by the input voltage waveform. Furthermore, the decoupling enables the implementation of new lighting applications which make use of encoded events to control the behavior of the LED 104.

Figure 3:
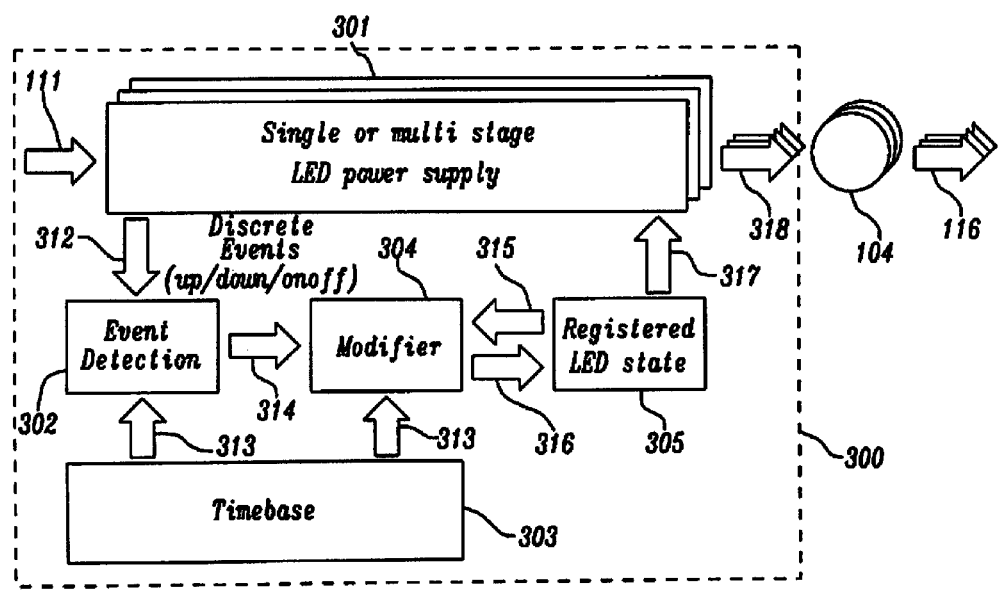
FIG. 3 shows the block diagram of an example decoupled power supply arrangement for an LED lamp.

FIG. 3 illustrates an example power supply arrangement 300 which decouples the power supplied to the LED 104 from the input voltage received from the mains supply. As for the arrangements 100, 120, the arrangement 300 is connected to the mains power supply and receives an input power 111. The received input voltage waveform 312 is passed to an event detection unit 302. The event detection unit 302 is configured to analyze the input voltage waveform 312 in order to detect one or more of the above mentioned events. For this purpose, the event detection unit 302 may make use of timing information (e.g. a clock signal) 313 received from a timebase unit 303. By way of example, an event may be defined by the evolution of the input voltage waveform 312 within a pre-determined time interval. The event detection unit 302 may analyze the input voltage waveform 312 while taking into account the time information 313.

The detected event 314 is passed to a modifier unit 304. The modifier unit 304 is configured to determine a new state of the power supply arrangement 300, based on the detected event 314. By way of example, the modifier unit 304 comprises a state machine of the arrangement 300 describing the transition between states of the arrangement 300 based on detected events 314. For this purpose, the modifier unit 304 may take into account the current state 315 of the arrangement 300 stored in the setting unit 305 (and/or in a memory of the arrangement 300). Furthermore, the modifier unit 304 may take into account timing information 313 obtained from the timebase unit 303. Using any one or more of this information (the detected event 314, time information 313, the current state 315), the modifier unit 304 is configured to determine a new state 316 of the arrangement 300.

The new state 316 of the arrangement 300 is passed to the setting unit 305 which is configured to determine the appropriate settings of the LED power supply 301 for implementing the new state 316. By way of example, if the new state 316 corresponds to a smooth increase of the intensity of the light, the appropriate settings of the LED power supply 301 enable the LED power supply 301 to smoothly increase the current (an consequently the power 318) towards the LED 104, thereby smoothly increasing the intensity of the emitted light 116. Alternatively, the new state 316 may be a fixed state at a fixed intensity level. The appropriate settings of the LED power supply 301 may enable the LED power supply 301 to provide an appropriate drive current to the LED 104 for generating light at the fixed intensity level. An example for the settings of the LED power supply 301 are the duty cycles of one or more power switches comprised within the LED power supply 301.

The LED power supply 301 may be a single stage power supply or a multi-stage power supply. The use of a multi-stage power supply may be beneficial to stabilize a (rectified) voltage received from the mains supply in a first stage, thereby providing a stable intermediate voltage, e.g. at a large capacitor between the first stage and the subsequent stage(s). The intermediate voltage may be in the range of 100-200V. Subsequently, the conversion to the supply voltage of the LED 104 may be done by converting the stable intermediate voltage using a second (and possibly further) power supply stages.

It should be noted further that each lamp assembly can include several parallel converters and light source modules (sub light sources). The illumination state can therefore comprise a vector of sub states valid for each of the parallel power supply and light source modules. This is illustrated in FIG. 3 which shows a plurality of power supplies 301 providing drive signals 318 to a plurality of light source modules 104 (each emitting light 116).

Figure 4:
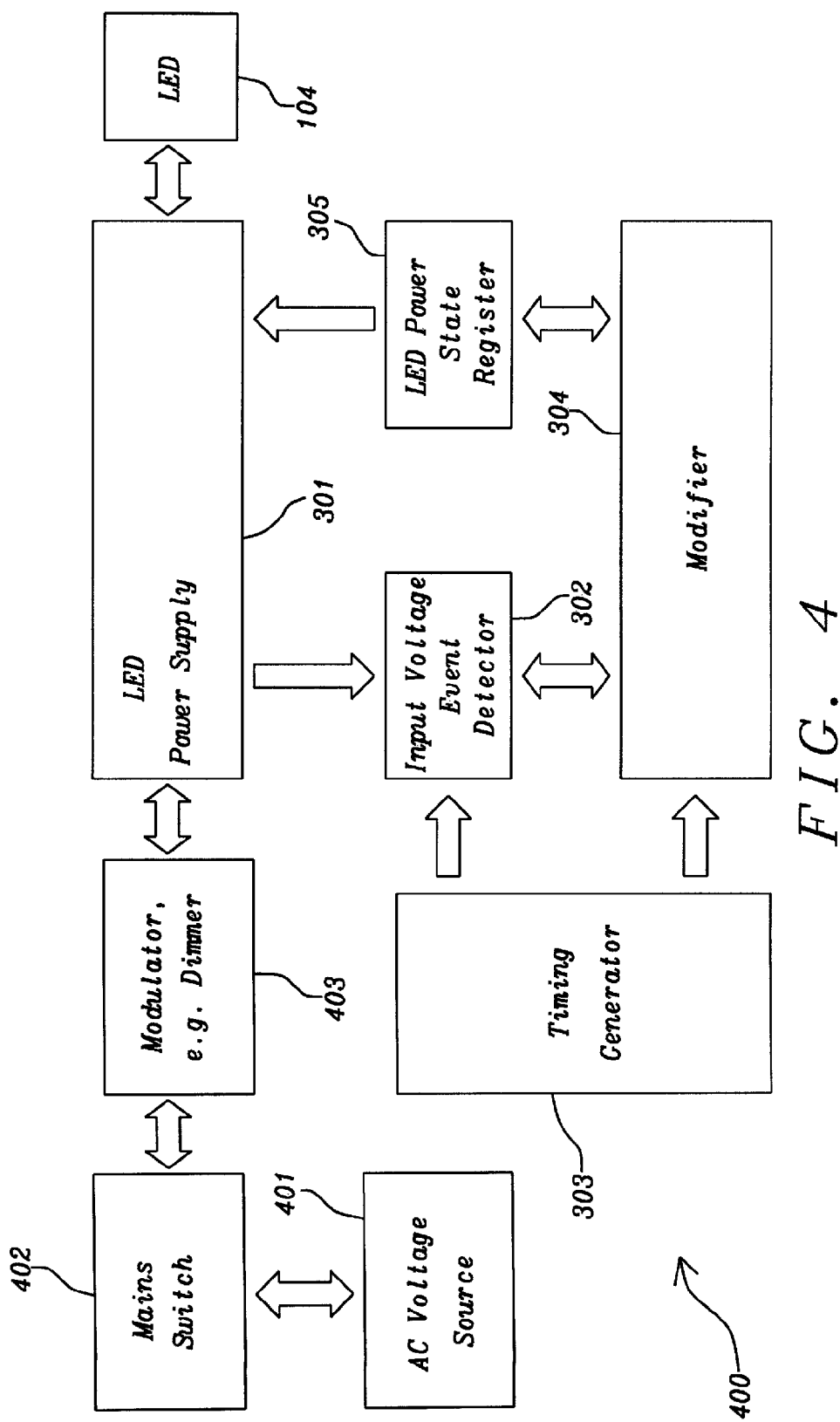
FIG. 4 shows an example power supply arrangement linked to a mains power supply.
Figure 5A:
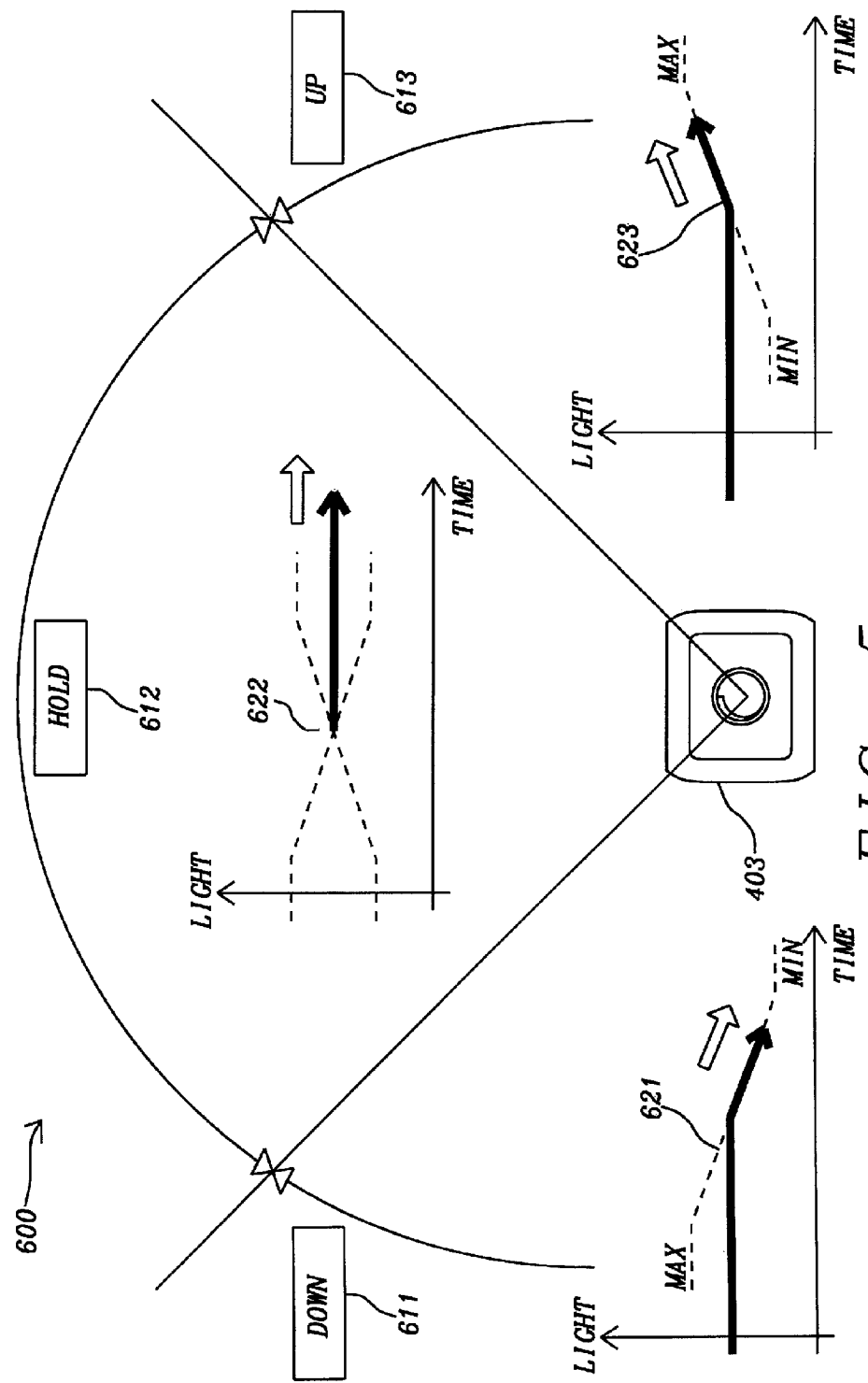
FIGS. 5a and b illustrate example methods for controlling the intensity of an LED lamp using a decoupled power supply arrangement.
Figure 5B:
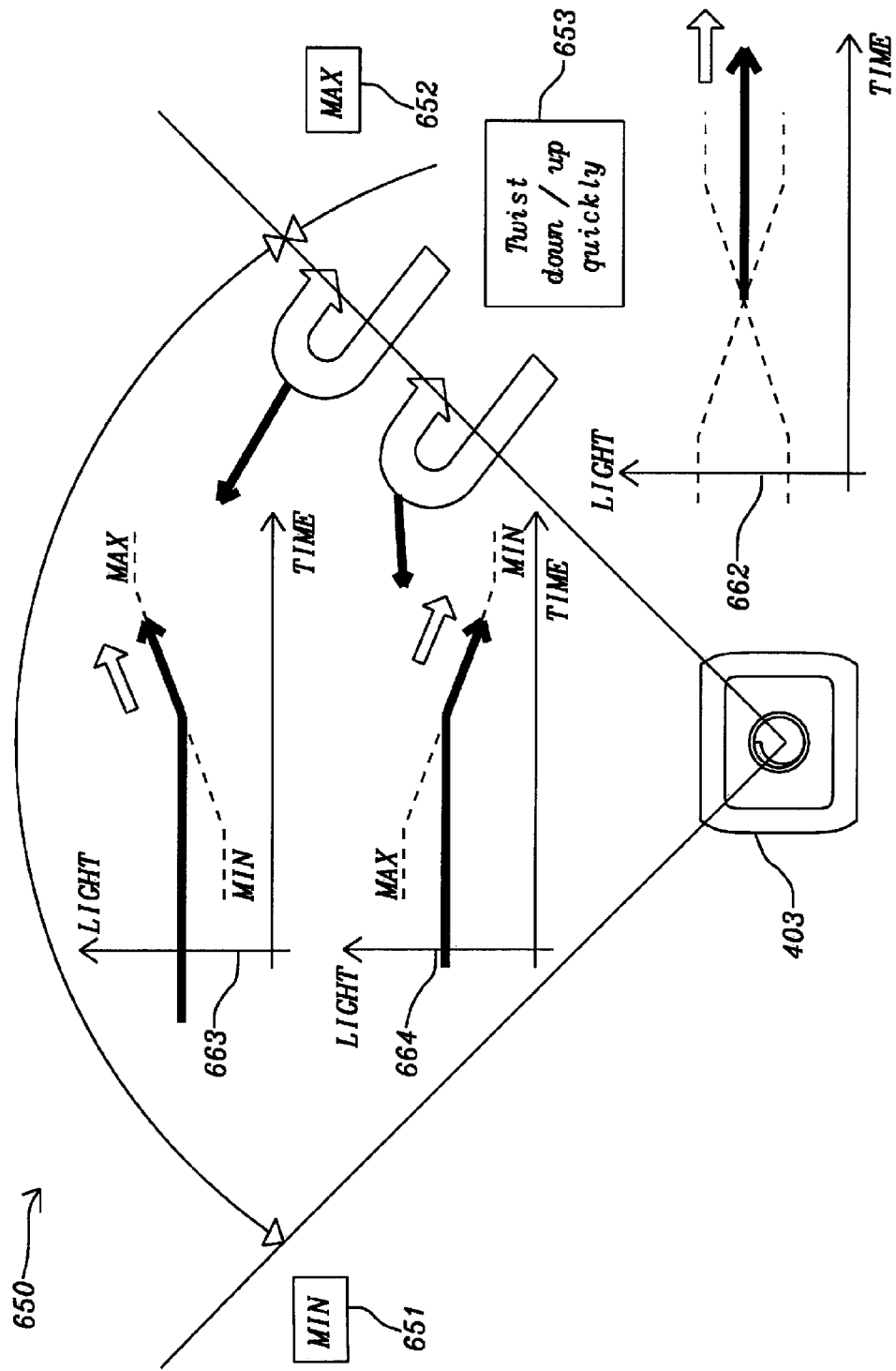

FIG. 4 illustrates an example system 400 comprising the power supply arrangement 300 of FIG. 3, as well as the LED 104. Furthermore, the system 400 comprises the AC voltage source 401 (e.g. a mains power supply), a mains (on/off) switch 402 and an optional (phase-cut) dimmer 403. The latter system components may be viewed as the control components or the signaling means of the power supply arrangement 300. In particular, the mains switch 402 and/or the dimmer 403 may be used as signaling means to encode data onto the mains voltage waveform. This encoded data may be detected by the power supply arrangement 300 as one or more events which control the states of the arrangement 300 and consequently the behavior of the LED 104. Example methods for encoding data onto the input voltage waveform 312 provided by the mains supply are illustrated in FIGS. 5a and 5b. It should be noted that other configurations of an overall lighting system 400 are possible. By way of example, other components of the mains power supply (e.g. other types of dimmers and/or switches) may be used as signaling means for encoding data directed at the control of the LED.

FIG. 5a illustrates an example method 600 (and a corresponding example state machine of the modifier unit 304) for implementing a dim function using a conventional phase-cut dimmer 403 as signaling means. The method 600 makes use of three events:
  a DOWN event 611: corresponding to an input voltage having a RMS voltage below a pre-determined "down" voltage value (e.g. 20% of maximum RMS voltage value).
  a HOLD event 612: corresponding to an input voltage having a RMS voltage within a pre-determined "hold" interval.
  an UP event 613: corresponding to an input voltage having a RMS voltage above a pre-determined "up" voltage value (e.g. 80% of maximum RMS voltage value).
The "down" voltage value, the "hold" voltage interval and the "up" voltage value may be selected to ensure a reliable detection of the three events. By way of example, the HOLD event 612 may be defined as the default event which is used when no DOWN or UP event 611, 613 is detected.

It should be noted that the RMS voltage value of the input voltage is only one possible way to define and detect a plurality of events. Alternatively or in addition, the events may be defined based on other parameters derived from the input voltage, e.g. the shape of the waveform of the input voltage. In general, any parameters of the input voltage waveform that can be reliably detected may be used to signal control information from the mains power supply to the power supply arrangement.

When detecting the DOWN event 611, the arrangement 300 is put into a dim down mode 621 which triggers a smooth decrease of light intensity down to the minimum intensity value. The HOLD event 612 may put the arrangement 300 into a hold state 622 where the current intensity at the particular detection time instant is maintained. The UP event 613 triggers the dim up state 623, where the intensity of the LED 104 is smoothly increased up to a maximum intensity level. As such, the conventional phase-cut dimmers may be used to dim the light of an LED based lamp. However, the phase-cut dimmers are used to encode events 611, 612, 613 into the input voltage waveform, in order to instruct the LED based lamp to enter a pre-determined number of different states 621, 622, 623.

FIG. 5b illustrates a further example method 650 (and a corresponding example state machine of the modifier unit 304) for implementing a dim function using a conventional phase-cut dimmer 403 as signaling means. The method 650 makes use of three events:
  a MIN event 651: corresponding to an input voltage having a RMS voltage below a pre-determined minimum voltage value (e.g. 20% of maximum RMS voltage value). The MIN event 651 may be detected if the input voltage remains below the pre-determined minimum voltage value for a minimum time interval (e.g. 1 second).
  a MAX event 652: corresponding to an input voltage having a RMS voltage above a pre-determined maximum voltage value (e.g. 80% of maximum RMS voltage value). The MAX event 652 may be detected if the input voltage remains above the pre-determined maximum voltage value for a minimum time interval (e.g. 1 second).
  a TWIST event 653: corresponding to an input voltage having an RMS voltage going down and up again (over a predetermined minimum (RMS) voltage gap and within a predetermined maximum time interval).

When switching on the LED 104, the LED 104 may be set to an initial fixed illumination state (e.g. a maximum or a most recent intensity level). If a TWIST event 653 is detected, the LED 104 may be put into a DIM up state 663. A subsequent TWIST event 653 may put the LED 104 into a HOLD state 662 which maintains the current intensity level. A further TWIST event 653 may trigger a DIM down state 664, and a further TWIST event 653 may again put the LED 104 into a HOLD state 662. The MIN event 651 may be used to directly put the LED into a fixed illumination state with minimum intensity level (e.g. 20%), whereas the MAX event 652 may be used to put the LED 104 into a fixed illumination state with maximum intensity level (e.g. 100%).

It should be noted that in an alternative embodiment, the states of the LED 104 (and of the corresponding power supply arrangement 300) may be defined as discrete illumination states of the LED 104 (and the corresponding driver states of the arrangement 300). By way of example, each intensity level (e.g. 0-100% intensity on a grid of 1% or 5% or 10% or any other intensity step size) may be defined as a different state. The arrangement 300 may be configured to determine an event on a regular basis (e.g. based on the timer signal 303) based on a pre-determined time grid (e.g. an UP event or a DOWN event). Each detected event may trigger a transition towards a new state. As such, a repeatedly received DOWN event may trigger the continuous decrease from an initial state at an initial intensity to a final state at a reduced intensity.

In the following, example implementations of a power supply arrangement 300 for use with the suggested dim approach are described in further detail.

Figure 6A:
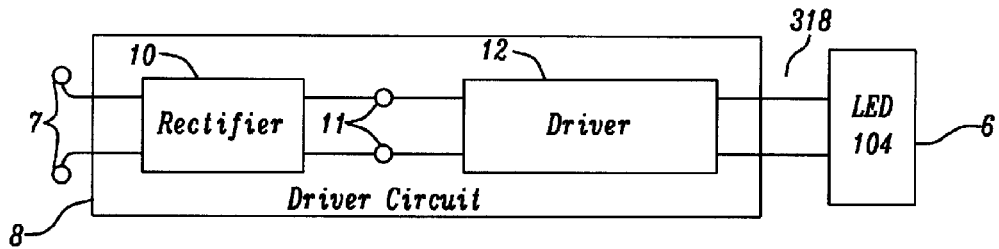
FIG. 6a illustrates a block diagram of an example power supply arrangement (also referred to as a driver circuit)

FIG. 6a illustrates an example power supply arrangement 300 (i.e. the driver circuit 8 of FIG. 1) and the LED 104 (i.e. the light source 6 of FIG. 1). The driver circuit 8 comprises a rectifier 10 which receives alternating current (AC) supply electricity from the mains supply, and delivers a rectified current (DC) 11 at its output. This DC power is received by a driver 12 which serves to output a controlled DC drive signal 318 in order to provide electrical power to the light source 6. The voltage and current characteristics of the output drive signal 318 from the driver 12 are determined by the type and number of LEDs employed in the light source 6. The power supplied to the light source 6 is controlled in dependence upon desired operating conditions of the light source 6. In one example, the light source 6 includes a plurality of LEDs, and requires a drive signal 318 having a voltage of 50V or more. In general, the drive signal 318 may be in the range of 10V to over 100V depending on the number of LEDs comprised within the light source 6.

Figure 6B:
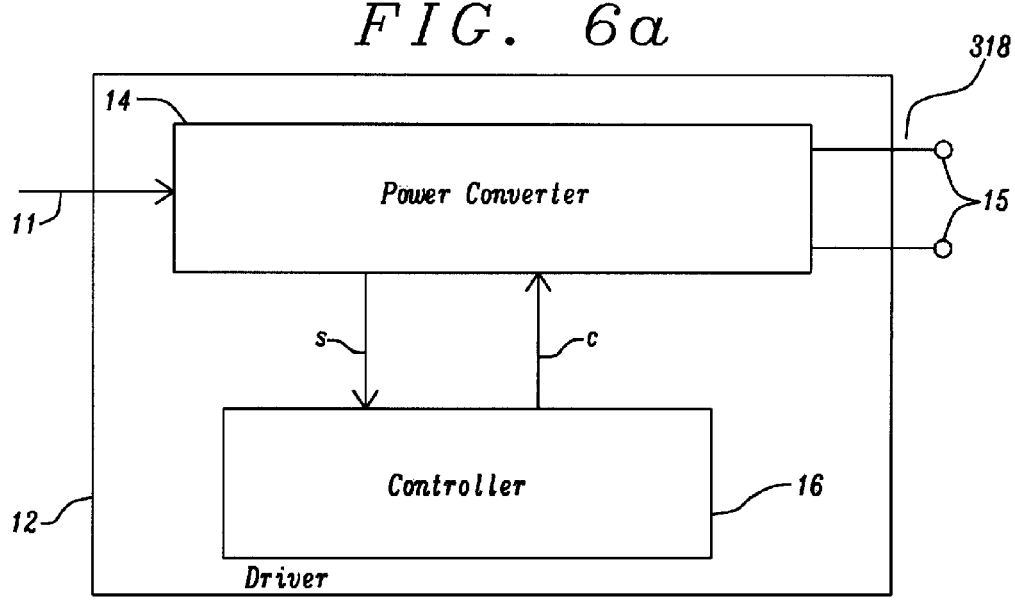
FIG. 6b illustrates a block diagram of an example driver comprised within a power supply arrangement.

FIG. 6b illustrates an example driver 12 suitable for use in the driver circuit 8 (or the power supply arrangement 300). The example driver 12 includes a power converter 14, and a controller 16. The power converter 14 receives DC power 11 from the rectifier 10, and operates to output a controlled drive signal 15, 318 to the light source 6. The controller 16 receives sensor or feedback signals S relating to the operation of the power converter 14 and/or to the operation of the light source 6. By way of example, the feedback signals S may comprise (a rectified version of) the input voltage waveform 312 which is used by the controller 16 to detect a particular event for controlling the illumination of the light source 6. Furthermore, the controller 16 provides control signals C to the power converter 14 in order that the drive signal 15 is appropriate to the desired operation of the light source 6. By way of example, the control signals C may comprise the control signal 317 from the setting unit 305 as described in the context of FIG. 3.

As such, the event detection unit 302, the timebase unit 303, the modifier unit 304 and/or the setting unit 305 of FIG. 3 may be implemented as a controller 16 shown in FIG. 6b. The LED power supply unit 301 of FIG. 3 may comprise the power converter 14 and possibly the preceding rectifier 10. The rectifier 10 provides a rectified input voltage 312 which is passed as a feedback signal S to the controller 16. The controller 16 detects one or more events from the feedback signal S (reference numeral 312) and implements the state machine as outlined above. As a result, the controller 16 determines a control signal C (reference numeral 317) which is used to control the power converter 14 to provide an appropriate drive signal 15, 318 (e.g. an appropriate drive current).

The power converter 14 may comprise an inductive energy storage device and a switch device. The switch device may be controlled by the controller 16, and may be provided by a metal oxide semiconductor field effect transistor (MOSFET) device, or other device suitable for switching high voltage (for example, tens of volts). It should be noted, however, that the controller 16 may comprise the switch device itself, thereby directly controlling the provisioning of an appropriate drive current 15, 318. The power converter 14 can be provided by any suitable circuit topology. For example, a buck converter circuit, a boost converter circuit, a buck/boost converter circuit, a SEPIC (single-ended primary-inductor converter) circuit, or a flyback converter circuit could be used for the power converter 14. It should be noted, however, that the power converter 14 is not limited to switched mode power converters, but may also be based on linear regulators or power converters using switched capacitors or any combination of these converter techniques.

Figure 6C:
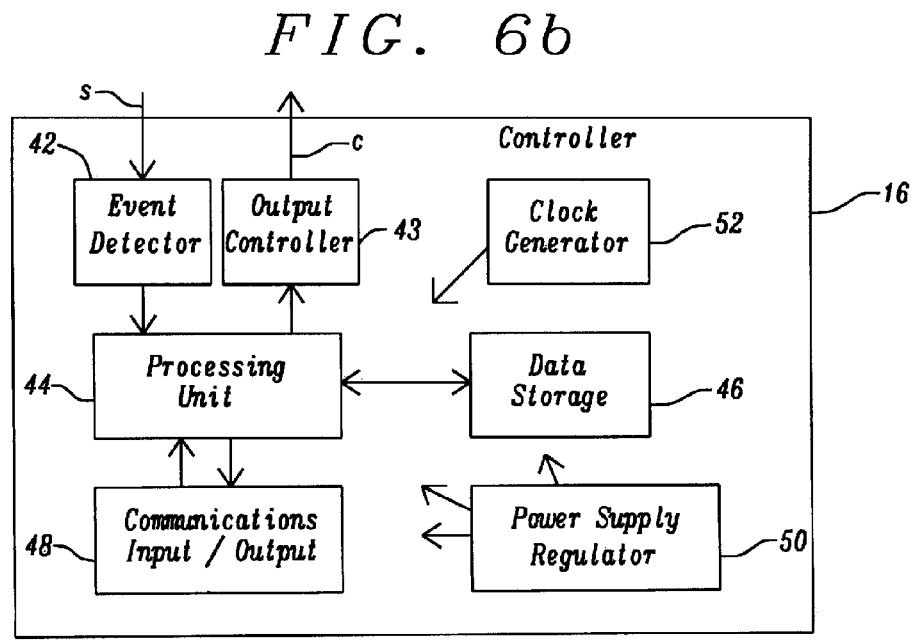
FIG. 6c illustrates a block diagram of an example controller comprised within a power supply arrangement.

FIG. 6c illustrates an example block diagram of a controller 16. The controller 16 includes an event detector unit 42, 302 connected for receiving sensor/feedback signals S 312, an output controller 43 for outputting control signals C (e.g. the control signal 317), a processing unit 44 for overall control of the system (e.g. for implementing the modifier unit 304), and a data storage unit 46 for storing data for use by the processing device (e.g. for implementing the setting unit 305). A communications input/output unit 48 may be provided for enabling the processing unit 44 to communicate with other devices, for example using a suitable wired or wireless communications protocol. The controller 16 also incorporates a power supply regulator 50, which supplies power to the devices within the controller 16, and a clock signal generator 52 (such as an oscillator circuit) (e.g. for implementing the timebase unit 303) for supplying a reference clock signal to the processing unit 44.

It should be noted that the clock signal generator 52 (i.e. the timebase unit 303) may make use of the periodicity of the mains cycle, in order to synchronize the states of the light source 6, 104 with the mains cycle. As such, the clock signals within a plurality of light bulb assemblies 1 can be synchronized using the common mains cycle. Consequently, the changes of states in a plurality of light bulb assemblies 1 may be performed in a synchronized manner. For this purpose, a reset event may be defined which triggers a default state for the plurality of light bulb assemblies 1, thereby ensuring a common initial state for all of the plurality of light bulb assemblies 1.

The processing unit 44 (referred to as the modifier unit 304 in FIG. 3) operates to generate the control signals C for controlling the switch device or devices in the power converter 14. Typically, the control signals will be pulse width modulated (PWM) signals that control the duty cycle (that is, the ratio of 'on' to 'off') of the switch device in the power converter 14, and hence to control the output drive signal 15. In an embodiment, the controller 16 is implemented as a microcontroller allowing for the implementation of a digital programmable state machine.

Figure 6D:
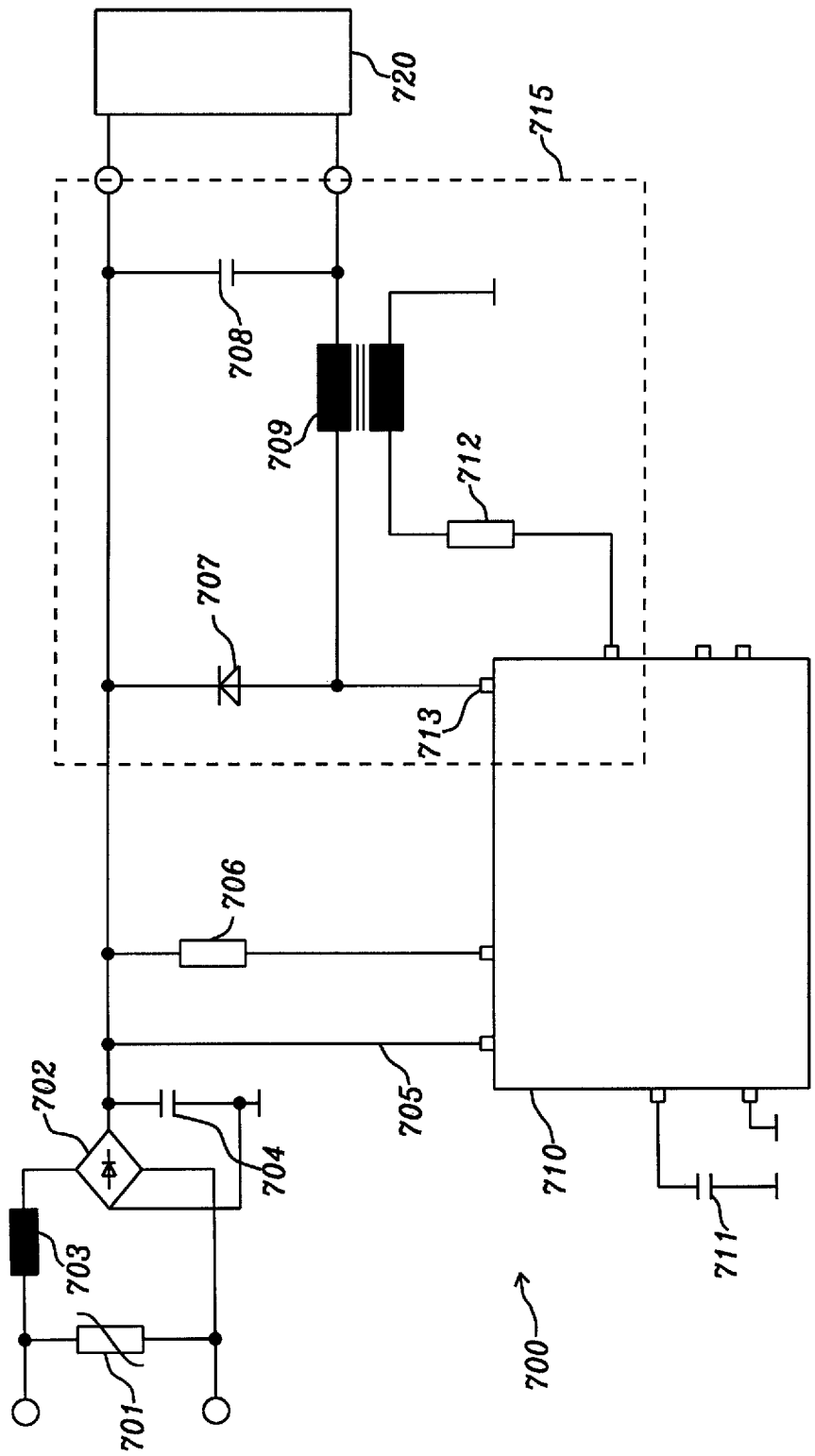
FIG. 6d shows a circuit diagram of an example decoupled power supply arrangement.

FIG. 6d illustrates an example circuit diagram 700 of a power supply arrangement 300 (i.e. of a driver circuit 8) comprising a single stage LED power supply 301. The circuit diagram 700 shows the AC mains supply 701, as well as a rectifier 702 in combination with EMI (electromagnetic interference) filter components 703, 704. The circuit diagram 700 comprises a controller 710 (e.g. the controller 16 of FIGS. 6b and 6c) which is connected to an integrated circuit (IC) power supply via a stabilizing capacitor 711. The controller 710 comprises a startup and sense pin 705. In the illustrated example, the pin 705 senses the rectified input voltage waveform 312 and thereby enables the controller 710 to perform event detection as outlined in the context of FIG. 3. In the illustrated example, the controller 710 implements the event detection unit 302, the timebase unit 303, the modifier unit 304 and the setting unit 305. As such, the controller 710 comprises some or all of the components of the controller 16 described in the context of FIG. 6c.

Furthermore, the controller 710 comprises a power switch connected to pin 713, which is used to implement a switched power supply 301 in conjunction with the electronic components 707, 708, 709 and 712. In the illustrated example, the LED power supply 301 is implemented as a buck converter 715 providing a galvanic isolation between the LED voltage and the mains voltage. The duty cycle of the power switch within the controller 710 can be adjusted (e.g. programmable) to control the illumination states of the light source 720 (e.g. to control a dim state). Furthermore, the duty cycle of the power switch within the controller 710 can be adjusted to adapt the power supply arrangement to the LED parameters (e.g. the number of serial LEDs 104) of the LED assembly 720.

Figure 6E:
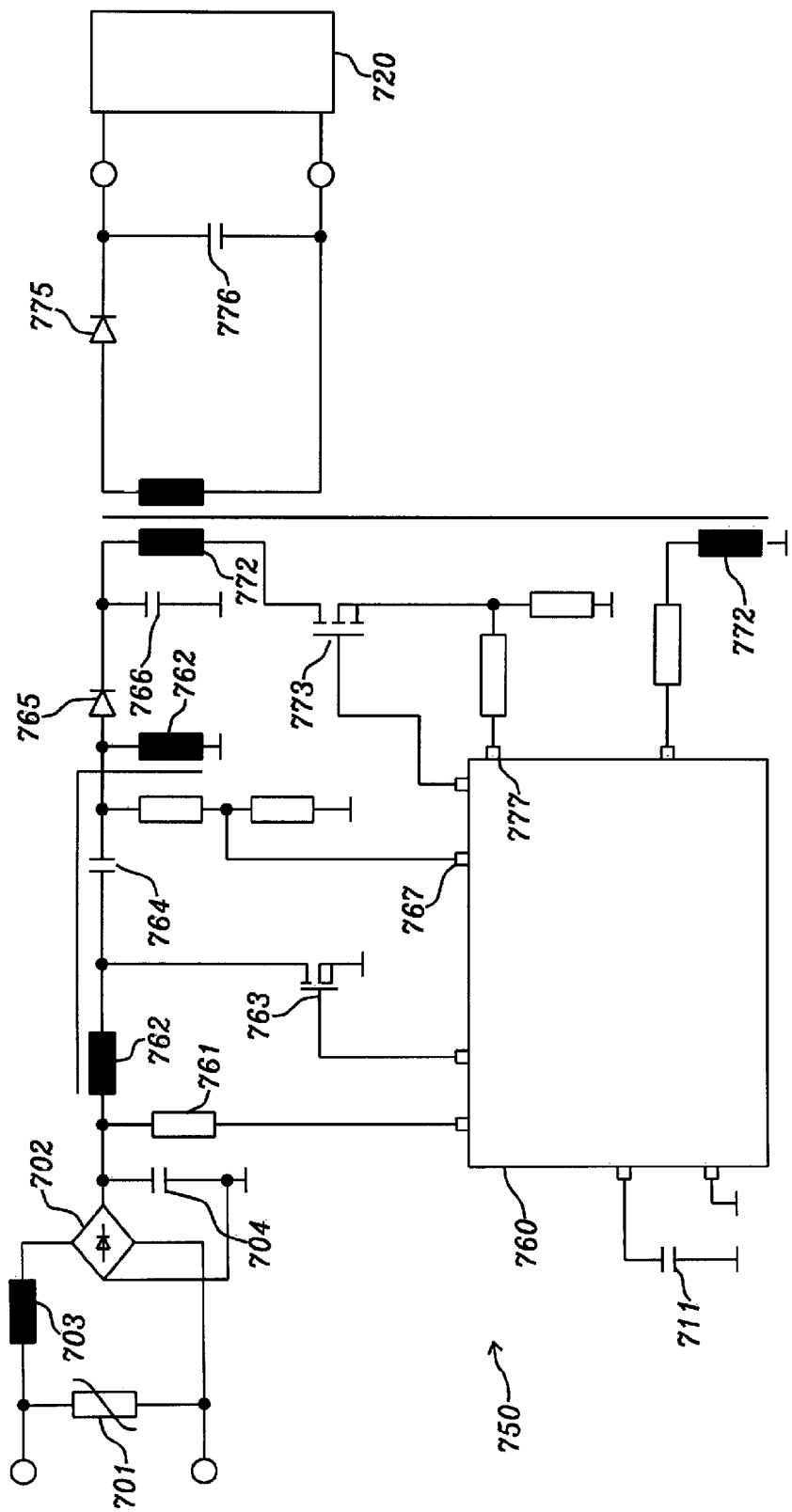
FIG. 6e shows another circuit diagram of an example decoupled power supply arrangement.

FIG. 6e illustrates an example circuit diagram 750 of a power supply arrangement 300 (i.e. of a driver circuit 8) comprising a dual stage LED power supply 301. The driver circuit comprises a controller 760 (e.g. a controller 16) providing at least two output pins for providing respective pulse width modulated driver signals to the two MOSFETs 763, 773 of the two converter stages. Furthermore, the controller

760 comprises a pin for startup and sensing using a startup resistor 761. The driver circuit of FIG. 6e makes use of a dual stage SEPIC/Flyback converter, wherein the first converter (a SEPIC converter) comprises the components 762, 763, 764, 765, 766 and wherein the second converter (a flyback converter) comprises the components 772, 773, 775, 776. In the illustrated example, the second converter stage provides for the SELV (Separated or safety extra-low voltage) requirements. Furthermore, the output of the first converter stage is sensed via the controller pin 767, thereby allowing for a regulation of the first converter stage. In a similar manner, the output of the second converter stage can be sensed using the input pin 777.

Figure 7:
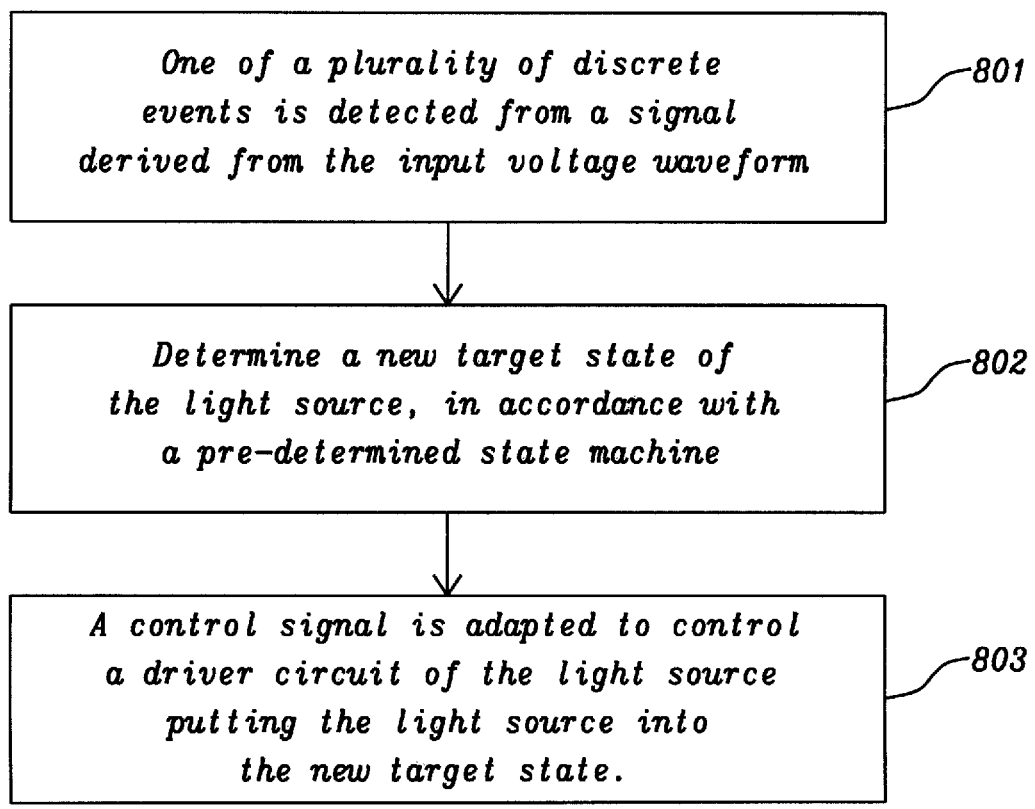
FIG. 7 illustrates a flow chart of an example method for controlling a light source.

FIG. 7 illustrates an example method 800 for controlling a driver circuit for a light source. In step 801, one of a plurality of discrete events is detected from a signal derived from the input voltage waveform of the mains power supply. The detected event is used in conjunction with the current state of the light source to determine a new target state of the light source, in accordance with a pre-determined state machine (step 802). Subsequently, a control signal is generated, wherein the control signal is adapted to control a driver circuit of the light source to provide a driver signal which puts the light source into the new target state (step 803).

In the present document, a method and system for controlling the intensity of a light source (e.g. an SSL based light source) has been described. In particular, it has been described how a programmable controller within a light bulb assembly can be used to implement complex intensity variation schemes of the light bulb (e.g. dimming) in a stable manner.

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

What is claimed is:

1. A light bulb assembly comprising:
    an electrical connection module configured to electrically connect to a mains power supply, thereby providing an input voltage waveform;
    a driver circuit configured to control a target state of a plurality of illumination states of a light source in dependence of a detected event from a plurality of events, encoded within the input voltage waveform; and
    the light source configured to provide light in accordance with the target state;
    wherein the driver circuit comprises:
        a power converter configured to convert power derived from the input voltage waveform of the mains power supply into a drive signal for the light source, wherein the drive signal depends on a current state of the plurality of illumination states wherein the power converter is at least one single ended primary inductance converter; and
        a controller configured to determine the target state of the plurality of illumination states from the input voltage waveform and from the current state, and to control the power converter to provide a corresponding drive signal for the target state; wherein the controller comprises an event detection unit configured to determine the detected event of the plurality of events encoded within the input voltage waveform of the mains power supply; wherein the plurality of events comprises one or more instant events at a particular time instant:
            a first instant event for which a characteristic value derived from the input voltage waveform at the particular time instant is greater than a pre-determined upper threshold;
            a second instant event for which a characteristic value derived from the input voltage waveform at the particular time instant is smaller than a pre-determined lower threshold; and
            a third instant event for which a characteristic value derived from the input voltage waveform at the particular time instant lies within a pre-determine voltage interval.

2. The light bulb assembly of claim 1, wherein the driver circuit is configured to control the plurality of illumination states of the light source.

3. The light bulb assembly of claim 2, wherein the controller comprises:
    a state register configured to store an indication of the current state of the plurality of illumination states;
    a state processor configured to determine the target state of the plurality of illumination states, based on the detected event and based on the current state; and
    an output control unit configured to control the power converter of the driver circuit to provide the drive signal for the target state.

4. The light bulb assembly of claim 3, wherein the plurality of illumination states comprises one or more of:
    a dim state during which an intensity level of the light source increases and/or decreases at a pre-determined dim rate;
    an on state during which the intensity level of the light source is substantially constant at a pre-determined maximum intensity level;
    an off state during which the intensity level of the light source is substantially zero; and
    a hold state during which the intensity level of the light source is maintained substantially constant at the intensity level of the light source at the time of entering the hold state.

5. The light bulb assembly of claim 3, wherein
    the light source comprises a plurality of sub light sources;
    the driver circuit is configured to control the plurality of sub light sources using a respective plurality of drive signals; and
    each of the plurality of illumination states comprises a sub-state for each of the plurality of sub light sources.

6. The light bulb assembly of claim 3, wherein the controller is configured to
    adjust one or more parameters of the plurality of events; and/or
    adjust one or more parameters of the plurality of illumination states; and/or
    adjust logic comprised within the state processor defining how the target state is determined based on the detected event and based on the current state.

7. The light bulb assembly of claim 2, wherein the controller is configured to control the power converter to provide the drive signal for dimming the light source, subject to determining a detected event associated with a dimming command and/or while the input voltage waveform of the mains power supply remains substantially unchanged.

8. The light bulb assembly of claim 1, wherein the plurality of events comprises one or more sequential events, wherein each of the one or more sequential events comprises a sequence of instant events in a pre-determined chronology.

9. A driver circuit for a light source wherein the driver circuit is configured to control a plurality of illumination states of the light source, the driver circuit comprising:
- a power converter configured to convert power derived from an input voltage waveform of a mains power supply into a drive signal for the light source, wherein the drive signal depends on a current state of the plurality of illumination states, wherein the power converter is at least one single ended primary inductance converter; and
- a controller configured to determine a target state of the plurality of illumination states from the input voltage waveform and from the current state, and to control the power converter to provide a corresponding drive signal for the target state; wherein the controller comprises an event detection unit configured to determine a detected event of a plurality of events encoded within the input voltage waveform of the mains power supply; the plurality of events comprises one or more instant events at a particular time instant:
  - a first instant event for which a characteristic value derived from the input voltage waveform at the particular time instant is greater than a pre-determined upper threshold;
  - a second instant event for which a characteristic value derived from the input voltage waveform at the particular time instant is smaller than a pre-determined lower threshold; and
  - a third instant event for which a characteristic value derived from the input voltage waveform at the particular time instant lies within a pre-determine voltage interval.

10. The driver circuit of claim 9, wherein the controller comprises:
- a state register configured to store an indication of a current state of the plurality of illumination states;
- a state processor configured to determine a target state of the plurality of illumination states, based on the detected event and based on the current state; and
- an output control unit configured to control the power converter of the driver circuit to provide a drive signal for the target state.

11. The driver circuit of claim 10, wherein the controller is configured to control the power converter to provide the drive signal for dimming the light source, subject to determining a detected event associated with a dimming command and/or while the input voltage waveform of the mains power supply remains substantially unchanged.

12. The driver circuit of claim 10, wherein the plurality of events comprises one or more sequential events, wherein each of the one or more sequential events comprises a sequence of instant events in a pre-determined chronology.

13. The driver circuit of claim 10, wherein the plurality of illumination states comprises one or more of:
- a dim state during which an intensity level of the light source increases and/or decreases at a pre-determined dim rate;
- an on state during which the intensity level of the light source is substantially constant at a pre-determined maximum intensity level;
- an off state during which the intensity level of the light source is substantially zero; and
- a hold state during which the intensity level of the light source is maintained substantially constant at the intensity level of the light source at the time of entering the hold state.

14. The driver circuit of claim 10, wherein
the light source comprises a plurality of sub light sources;
the driver circuit is configured to control the plurality of sub light sources using a respective plurality of drive signals; and
each of the plurality of illumination states comprises a sub-state for each of the plurality of sub light sources.

15. The driver circuit of claim 10, wherein the controller is configured to
adjust one or more parameters of the plurality of events; and/or
adjust one or more parameters of the plurality of illumination states; and/or
adjust logic comprised within the state processor defining how the target state is determined based on the detected event and based on the current state.

16. A controller for a driver circuit of a light source, wherein the driver circuit is configured to control a light source according to a plurality of illumination states using a power converter; wherein the power converter is configured to convert power derived from an input voltage waveform of a mains power supply into a drive signal for the light source; the controller comprising
an event detection unit configured to determine a detected event of a plurality of events encoded within the input voltage waveform of the mains power supply;
wherein the plurality of events comprises one or more instant events at a particular time instant; wherein the instant events comprise
  a first instant event for which a characteristic value derived from the input voltage waveform at the particular time instant is greater than a pre-determined upper threshold;
  a second instant event for which a characteristic value derived from the input voltage waveform at the particular time instant is smaller than a pre-determined lower threshold; and
  a third instant event for which a characteristic value derived from the input voltage waveform at the particular time instant lies within a pre-determine voltage interval;
a state register configured to store an indication of a current state of the plurality of illumination states;
a state processor configured to determine a target state of the plurality of illumination states, based on the detected event and based on the current state; and
an output control unit configured to control the power converter of the driver circuit to provide a drive signal for the target state.

17. The controller of claim 16, wherein the controller is configured to control the power converter to provide a drive signal for dimming the light source, subject to determining a detected event associated with a dimming command and/or while the input voltage waveform of the mains power supply remains substantially unchanged.

18. The controller of claim 16, wherein the state processor is configured to determine the target state in accordance with a pre-determined state machine.

19. The controller of claim 16, wherein the state register is configured to store settings for controlling the power converter to provide the drive signal for the current and the target state.

20. The controller of claim 16, wherein the plurality of events comprises a predetermined modulation of the input voltage waveform, e.g. a modulation of a phase section of the input voltage waveform.

21. The controller of claim 16, wherein the plurality of events comprises one or more sequential events, wherein each of the one or more sequential events comprises a sequence of instant events in a pre-determined chronology.

22. The controller of claim 16, wherein the plurality of illumination states comprises one or more of:
   a dim state during which an intensity level of the light source increases and/or decreases at a pre-determined dim rate;
   an on state during which the intensity level of the light source is substantially constant at a pre-determined maximum intensity level;
   an off state during which the intensity level of the light source is substantially zero; and
   a hold state during which the intensity level of the light source is maintained substantially constant at the intensity level of the light source at the time of entering the hold state.

23. The controller of claim 16, wherein
   the light source comprises a plurality of sub light sources;
   the driver circuit is configured to control the plurality of sub light sources using a respective plurality of drive signals; and
   each of the plurality of illumination states comprises a sub-state for each of the plurality of sub light sources.

24. The controller of claim 16, wherein the controller is configured to
   adjust one or more parameters of the plurality of events; and/or
   adjust one or more parameters of the plurality of illumination states; and/or
   adjust logic comprised within the state processor defining how the target state is determined based on the detected event and based on the current state.

25. The controller of claim 16 further comprising
   a timebase unit configured to generate a clock signal based on a cycle of the mains power supply.

26. The controller of claim 25, wherein
   the event detection unit is configured to determine the detected event under consideration of the clock signal; and/or
   one or more of the plurality of illumination states take into account the clock signal.

27. A method for controlling a plurality of illumination states of a light source; the method comprising
   converting power derived from an input voltage waveform of a mains power supply into a drive signal for the light source; wherein the drive signal depends on a current state of the plurality of illumination states;
   determining a detected event of a plurality of events encoded within the input voltage waveform; the plurality of events comprising one or more instant events at a particular time instant:
      a first instant event for which a characteristic value, deriving from the input voltage waveform at the particular time instant, is greater than a pre-determined upper threshold;
      a second instant event for which a characteristic value, deriving from the input voltage waveform at the particular time instant, is smaller than a pre-determined lower threshold; and
   a third instant event for which a characteristic value, deriving from the input voltage waveform at the particular time instant, lies within a pre-determined voltage interval
   determining a target state of the plurality of illumination states, based on the detected event and based on the current state; and
   controlling a power converter to provide the drive signal for the target state.

28. The method for controlling a plurality of illumination states of the light source of claim 27, further comprising
   configuring a state register to store an indication of the current state of the plurality of illumination states.

29. The method for controlling a plurality of illumination states of the light source of claim 27, the plurality of illumination states comprising one or more of:
   a dim state during which an intensity level of the light source is increasing and/or decreasing at a pre-determined dim rate;
   an on state during which the intensity level of the light source is staying substantially constant at a pre-determined maximum intensity level;
   an off state during which the intensity level of the light source is staying substantially zero; and
   a hold state during which the intensity level of the light source is being maintained substantially constant at the intensity level of the light source at the time of entering the hold state.

30. The method for controlling a plurality of illumination states of the light source of claim 27,
   the light source comprising a plurality of sub light sources;
   configuring the driver circuit to control the plurality of sub light sources using a respective plurality of drive signals; and
   each of the plurality of illumination states comprising a sub-state for each of the plurality of sub light sources.

* * * * *